Patented Feb. 10, 1931

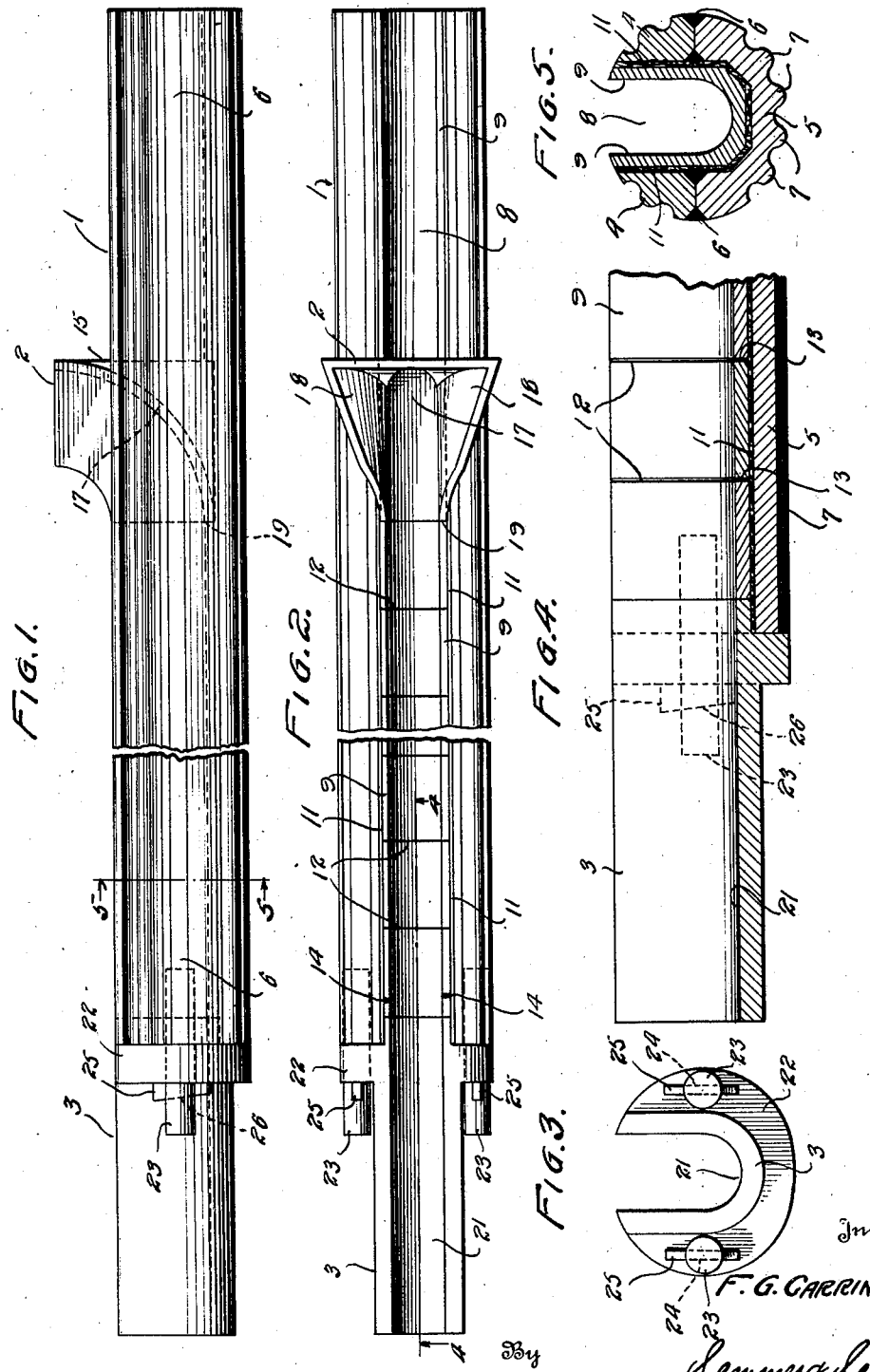

1,792,069

UNITED STATES PATENT OFFICE

FRANK G. CARRINGTON, OF ANNISTON, ALABAMA, ASSIGNOR TO FERRIC ENGINEERING COMPANY, OF ANNISTON, ALABAMA, A CORPORATION OF DELAWARE

APPARATUS FOR POURING METAL IN MOLDS

Application filed July 6, 1927. Serial No. 203,834.

This invention relates in general to the centrifugal casting of pipe, and more particularly has reference to a trough.

While the principles of my invention may be incorporated in various forms of trough, such as a side dump trough, the apparatus to which my invention especially appertains comprises a mold suitably mounted for rotation, and a pouring trough to receive molten metal, and adapted to convey it to a point in the mold where it is discharged therein. While I shall refer to the pipe material as "metal", it is to be understood that I do not confine the application of my invention to the casting of metal pipe. It is of course obvious that my invention may be employed where pipe is composed of other materials.

The mold and trough move axially with respect to each other. The mold may be stationary while the trough moves axially, or the trough may remain stationary while the mold telescopes over it, or the relative axial movement may be accomplished by a movement of both of the elements. This axial movement, together with the rotation of the mold, results in the pipe material being laid down on the interior of the mold in successive and adjacent spiral columns. Inasmuch as each particle of metal is deposited in approximately that position in the mold in which it is found in the finished casting, little adjustment of the metal is required after pouring.

The advantages of this method of casting are apparent. It is not necessary that the mold employed have a low heat conductivity, for the metal may solidify substantially the moment it strikes the mold; a casting of regular formation is obtained, notwithstanding the rapid solidification of the metal; and the thickness of the metal at any point throughout the length of the pipe may be regulated.

But certain disadvantages have been attendant heretofore upon this system of casting, one of the principal defects residing in a warpage or sagging of the pouring trough employed. Because of the relative axial movment of the trough and mold, it is possible to support the trough at only one end, and that end is necessarily the one outside of the mold. There is therefore always a considerable part of the trough which is without any direct support. The weight of this portion, especially when the trough is heated as the result of contact with molten metal, causes the end of the trough to droop or sag.

The diameters of pipes cast by the centrifugal process have a fairly wide range but regardless of the size of the pipe there is always the chance of the trough's scraping on the bottom of the mold. This is, of course, especially true in the case of pipes of small diameter where there is a limited clearance between the trough and mold. Even where the pipe is of large diameter, sagging of the trough impedes the fine regulation of the discharge of metal into the mold that is so essential in centrifugal casting.

The troughs heretofore employed have become overheated after a short period of operation, accentuating the sagging and increasing the difficulty, and even danger of operation.

The channels of the troughs are generally lined with suitable material. The material may be highly refractory but in some cases cast iron or other metal is used. In these later instances it has been found that the time of pouring is usually insufficient to cause the channels of the troughs to melt. The linings heretofore employed, however, have warped as a result of uneven heating of the lining. That portion in contact with molten metal expands at a greater rate than does the rest of the lining. Aside from the necessity for frequent replacements this causes a further loss of accuracy in the pouring of the metal.

To overcome the above, and other, disadvantages inhering in troughs heretofore employed is one of the objects of this invention.

Another object is to provide a trough economical of construction and subject to facile operation.

A further object is to provide a non-warpable trough.

A still further object is to provide a non-warping trough lining.

And yet another object is to provide a trough that does not become super-heated.

To accomplish the above, and other important objects as will more fully appear hereinafter, my invention comprises in general a trough in which the bottom portion expands at a greater rate than the upper portion, and of a configuration to insure a rapid radiation of heat therefrom, and a non-warpable lining.

To insure a complete comprehension of the scope of my invention, but wishing it to be clearly understood that many modifications may be made in the particular structure depicted without exceeding the scope of the appended claims, reference is made to the accompanying drawings in which similar numerals refer to the same parts:

Figure 1 is a side view in elevation of my invention;

Fig. 2 is a top plan view of the structure shown in Figure 1;

Fig. 3 is a front elevational view of a spout and means for connecting the spout to the trough;

Fig. 4 is a cross-sectional view along the line 4—4 of Fig. 2 looking in the direction of the arrows;

Fig. 5 is a cross sectional view along the line 5—5 of Fig. 1 looking in the direction of the arrows.

Referring more particularly to Figure 1, there is shown a pouring trough, generally indicated by the numeral 1, a chute 2, and a spout 3. The trough is composed of two materials, as shown in more detail in Figure 5.

While I shall refer throughout this application to specific materials, it is of course to be understood that substitutions therefor may be made to accomplish the same general results. The upper portion 4 of the trough may be composed of steel having one coefficient of expansion. The lower portion 5 of the trough may be composed of another material, such as brass, having a larger coefficient of expansion. These parts of the trough are joined together by welding 6, as shown in Figure 5.

The purpose of using materials of different linear coefficients of expansion is to insure that with an increase in temperature there will be a difference in expansion between the top and bottom. By composing the lower part of the trough of a material with a larger coefficient of expansion, that portion of the trough on heating will expand to a greater extent than the upper part. Inasmuch as sagging of the trough is caused by, or results in, a stretching of the upper portion and a compressing of the lower portion, a greater expansion at the bottom than at the top of the trough counteracts the tendency to sag.

When molten metal is flowing through the trough, there is a heat exchange between the metal and the trough. Insulators may be provided to minimize this exchange, but at best it is merely a difference in degree. Since the amount of sag depends upon the ductility of the trough material, and since the ductility varies with the temperature, when the trough becomes heated there is a greater sag than ordinarily. The problem in this connection is therefore one of keeping the temperature of the trough as low as possible, and at the same time having sufficient heat to effect a differential expansion of the trough.

One of the means comprehended by my invention to keep the temperature of the trough at a minimum, is an increase in the radiating surface of the trough. Longitudinal serrations 7 are provided which facilitate the escape of heat from the trough. By thus reducing the temperature, the tendency of the trough to sag is diminished, and the heat that passes from the metal through the trough, prior to its radiation, causes the differential expansion between the top and bottom, referred to above. By providing the proper difference in expansion, both the ordinary sagging and the increased tendency to sag by reason of increased heat will be cared for.

The casing is provided with a channel 8 in which a lining 9 is fitted. Interposed between the lining and the trough casing however there is a heat insulating material 11, such as asbestos. This material tends to minimize the heat exchange between the lining and the trough casing, and, with the serrations 7, serves to maintain the casing at a low temperature.

The lining may be composed of a highly refractory material, such as stellite, having a high fusion point, but as previously stated metals such as cast iron may be used because the time of pouring is usually insufficient to cause them to be raised to a sufficiently high temperature to melt. Referring more particularly to Fig. 4, the lining 9 is provided with slots 12. These slots may be made by extracting portions of the lining, or the lining may be made in sections as in the appended drawings and joined together at certain points. Although the lining is shown joined only at the base, as at 13, modifications may be made whereby the point of juncture is at some other place. And while I have shown the lining sections joined by welding they may be provided with slight projections to separate adjoining sections except at such projections. Such sections may be held in alignment by any suitable means, such as bolts extending through the projections.

By providing the slots 12 in the lining it will be seen that each section may expand substantially independently of every other section. When each section is made in a short length, the difference in expansion will not be sufficient to cause an appreciable warpage. If the sections are joined along the line of the greatest expansion, the slots will become enlarged when the lining is heated. If the sections are joined at points other than the greatest expansion, the expansion of the lining will merely result in decreasing the size of the slots. By making the sections of the proper size, and by providing the necessary slots, expansion of the lining will be taken up by such slots, and will prevent warpage.

The lining should be joined to the trough casing or asbestos at only one point, as at 14, in order that it may be free to creep in the channel of the casing. I have shown this point of juncture near the spout 3 so that all creeping will be away from the spout, and will not create a pressure that would tend to separate the spout from the casing.

In Figures 1 and 2 there is shown the chute 2 which fits in the channel 8. The asbestos may or may not be left in the channel, but the lining may be removed from that portion of the trough where the chute is to rest. A rear member 15 extends from the top of the chute to the base, and is of a shape to fit in the channel 8. The member 15 serves as a support for a curved floor 17 of the chute. Side wings 18 are provided which are bent out at the top to catch any splashings. The wings 18 also serve as supports for the floor 17. It is to be noted that the top of the floor 17 at the base is flush with the top of the lining channel floor as at 19. The metal, on striking the floor 17, flows down the incline into the channel of the lining member.

The chute may be joined to the lining by welding, as shown in the drawings, or by any other suitable means to insure a fluid tight fit. As the lining 9 expands and creeps along the channel of the casing, the chute 2 will likewise be moved, but will always maintain a proper joint with the lining.

The spout 3 is provided with a channel 21 which is a continuation of the channel of the lining. A flange 22 is provided on one end of the spout, and has drilled in it apertures adapted to receive studs 23, securely fixed in the discharge end of the casing. These studs are provided with slots as indicated by the dotted lines 24 in Fig. 3. Pegs 25 are inserted in these slots. The ends of the slots remote from the casing are angular as at 26 and the pegs 25 are cut to conform to this angle. The pegs 25 therefore act as wedges, and the tightness of the fit between the flange 22 and the casing depends upon the extent to which the pegs 25 are inserted in the slots.

The operation of my invention is apparent from the foregoing. Metal, or other material of which the pipe is to be composed, is poured in the chute 2. The greater bulk flows onto the floor member 17, but any particles that might splash after striking the floor member are caught by the wings 18 and diverted to the floor 17. The metal by gravity flows down the floor member to the channel of the lining, and again by gravity flows the length of the lining and is discharged into the revolving mold at the termination of the spout.

The slots 12 of the lining are not of a sufficient size to permit any of the molten metal to become lodged in them. Under certain circumstances they may be filled with a suitable material to permit expansion or contraction of the slots. As the metal flows along the channel of the lining there is a certain heat exchange between the two, but the lining is not raised to such a high temperature as to injure it.

The heat exchange between the molten metal and the lining causes the latter to expand. This expansion is not uniform across the lining, but inasmuch as the lining is anchored to the casing by means of the bolts 14 it creeps toward the receiving end of the trough, pushing the chute 2 with it. The warpage of the lining is counteracted, for each section is capable of expanding independently and the lining in entirety may expand independently of the casing.

The asbestos serves as a heat insulator and permits only a limited amount of the heat of the lining to permeate the casing. Ordinarily the amount of heat that would enter the casing increases the tendency of the casing to sag. By composing the bottom portion of the casing of a material that has a greater coefficient of expansion than the material composing the top, the bottom portion expands at a greater rate than the top and counteracts the tendency of the casing to sag. The fins and serrations 7 accelerate the radiation of heat and serve to maintain a lower temperature of the casing.

In preventing a sagging of the casing and a warpage of the lining, the pouring trough maintains its original shape and insures accuracy in the pouring of the metal. Aside from a more efficient method of casting it is apparent that my invention affords a substantial saving in time and money in the centrifugal casting of pipe.

I have shown in detail a particular form of apparatus to accomplish the results obtained by my invention and have specified, in an exemplary manner, the composition of certain parts. It is to be understood however that numerous modifications may be made in the apparatus which will accomplish the same results and which will embody the substance of my invention. The scope of my invention is to be limited merely by the appended claims.

I claim:

1. A pouring trough for a centrifugal casting apparatus comprising a serrated warpage compensating casing provided with a channel, and a refractory lining for the channel adapted to expand independently of the casing.

2. A trough in a centrifugal casting apparatus comprising a serrated casing having a greater coefficient of expansion in its lower portion than in the upper portion, a channel in the casing, and a non-warpable lining for the channel.

3. In a centrifugal casting apparatus, a pouring trough comprising a serrated casing possessing a greater coefficient of expansion at the bottom than at the top, a refractory lining for the channel adapted to expand independently of the casing, and, interposed between the casing and lining, material having non-heat conducting properties.

4. An end pouring trough in a centrifugal casting apparatus comprising a serrated casing adapted to expand at a greater rate at the bottom than at the top, a channel in the casing, a slotted lining adapted to expand independently of the casing, and heat insulating material interposed between the lining and casing.

5. In an end pouring trough, means to join a casing to a spout comprising slotted studs mounted on the discharge end of the casing adapted to project through apertures in the spout, and pegs for insertion in the slots.

6. A spout for an end pouring trough comprising a body portion having a channel formed therein, an apertured flange on the body portion adapted to fit against the discharge end of the trough, studs on the trough having apertures therein, said studs being receivable in the apertures in said flange, and means adapted to be received in the apertures in the studs for retaining said spout in place.

7. A pouring trough comprising a metallic casing, a refractory lining and insulating material between the casing and lining.

8. In a centrifugal casting apparatus a trough comprising a casing having its lower portion formed of brass and its upper portion formed of steel and a lining positioned within said casing.

9. A trough for a casting apparatus, said trough comprising a casing formed of materials having properties suitable for a casing of a molten metal pouring trough, the material of the upper portion of the casing having a coefficient of expansion less than that of the lower portion to compensate for heat warpage, a lining for said trough, heat insulating means between said casing and said lining, a chute adapted to discharge molten metal into said trough, and a discharge spout attached to said casing.

10. In a centrifugal casting apparatus a trough comprising a casing having an outside conformation to insure rapid heat radiation and composed of materials having properties suitable for a casing of a pouring trough, the material in its lower portion having a greater coefficient of expansion than the material composing the upper portion, a channel in the casing, a non-warpable lining adapted to expand independently of the casing, and material of low heat conductivity interposed between the lining and the casing.

11. A pouring trough comprising a casing having the lower portion formed of brass, and the upper portion formed of steel, a refractory lining positioned therein, and asbestos insulating material between the casing and lining.

In testimony whereof I affix my signature.

FRANK G. CARRINGTON.